Figure 1:
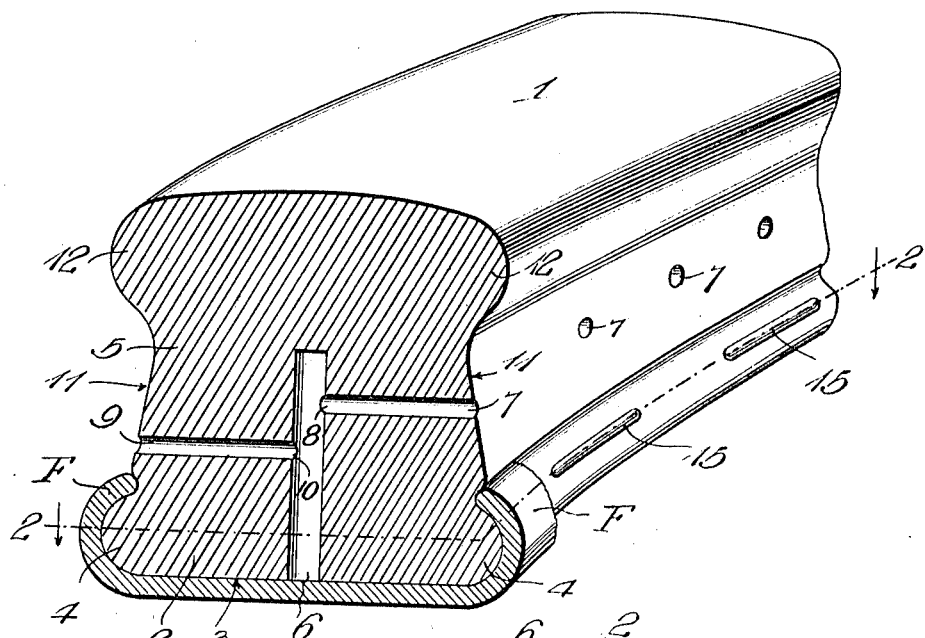

M. J. SELZER.
CUSHION TIRE.
APPLICATION FILED JUNE 10, 1912.

1,064,097.

Patented June 10, 1913.

Witnesses

Inventor
Michel J. Selzer
By H. B. Willson &Co
Attorneys

UNITED STATES PATENT OFFICE.

MICHEL J. SELZER, OF AKRON, OHIO.

CUSHION-TIRE.

1,064,097. Specification of Letters Patent. Patented June 10, 1913.

Application filed June 10, 1912. Serial No. 702,789.

*To all whom it may concern:*

Be it known that I, MICHEL J. SELZER, a citizen of the United States, residing at Akron, in the county of Summit and State of Ohio, have invented certain new and useful Improvements in Cushion-Tires; and I do declare the following to be a full, clear, and exact description of the invention, such as will enable others skilled in the art to which it appertains to make and use the same.

This invention relates to resilient tires, and more especially to those which are known as "cushion tires;" and the object of the same is to prolong the life of a tire by providing ventilating openings in it and means for forcing air through said openings automatically. This object is carried out by constructing the tire as hereinafter specifically described and claimed, and as shown in the drawings, wherein—

Figure 2:
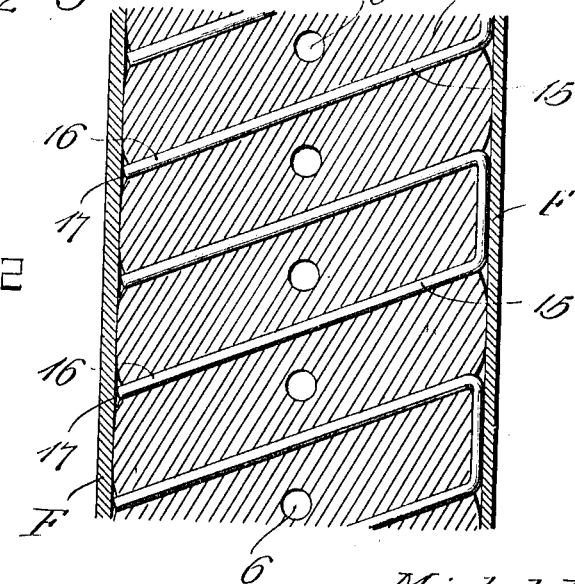

Figure 1 is a sectional detail of this improved tire, taken through one set of openings therein; Fig. 2 is a horizontal section through the face of this improved tire, taken on about the line 2—2 of Fig. 1, and showing it in place within a flanged rim.

The specific configuration and size of the tire shown in the accompanying drawings for purposes of illustration, form no part of the present invention. The tread 1 of the tire may be of any shape and with or without anti-skid formation as desired; the base 2 may also be of any shape but is by preference flat on its face 3, and at its side edges it by preference has projecting ribs 4 adapted to be engaged by the channeled flanges F along the edges of a wheel-rim of any kind. It is also immaterial to this invention whether said flanges are integral with the rim or of some movable type, as where one flange is fixed upon the rim and the other is slipped into place when the tire is applied to the wheel, and my construction of tire is very well adapted to this form of fastening. That portion of the tire between its tread 1 and base 2 may be said to be the "body" thereof, and in the illustration it is made of one piece of material integral with both the tread and base portions, although this detail also is unessential, and the precise material or combinations of materials employed does not enter into the present invention further than that the tire shall be to an extent resilient and will contain more or less rubber.

Rubber deteriorates with age and under heat, and the heat set up by kneading or compressing a solid piece of rubber, or a piece of rubber in composition with some other material or materials, is extremely injurious to it—especially when it is a tire and the compression and expansion are intermittent, rapid, and perhaps combined with considerable torsion as when the tire is on one of the driving wheels. To off-set this as far as possible, ventilating openings have been made through cushion tires of rubber so that air may pass through the same unless the openings should become clogged. The present invention consists in providing such openings in the body 5 of this improved tire, and I construct them as follows: One set of openings 6 may be said to be vertical, and they extend from the inner face 3 of the base 2 on substantially radial lines, and preferably straight outward at the transverse center of the tire and into its body 5 to a point near its tread 1, and these openings may have any desired cross section. Another set 7 may be said to be horizontal, and they extend from one side 11 of the body 5, and at points about midway of the width of said side, inward to the vertical openings 6 near the outer ends of the latter where they merge with or open into them at the point 8. The third set of openings 9 may also be said to be horizontal and they extend from the opposite side of the body 5 inward to the vertical openings 6, with which they connect and into which they merge at the point 10 somewhat nearer the inner face 3 of the base 2 than the point 8. The cross section of the openings 7 and 9 may be of any desired shape, but by preference they are somewhat smaller than the vertical openings 6. Such sides are by preference provided with rolls or enlargements 12 where they merge into the tread 1, and all of the horizontal openings open out through the sides 11 above said rolls 12, or nearer to the hub so that their outer extremities are somewhat protected from the roadway by means of this roll. A cushion tire of rubber or of rubber composition thus ventilated possesses the advantage that at each revolution of the wheel where the material of the tire is compressed the outermost openings 7 are more or less closed so that the air standing in them is ejected, part of it outward through the side 11 of the tire and the remainder inward through the point 8 where each opening communicates with the vertical opening 6 with which it is connected, and thence through the point 10 into and along the other opening 9 and out the other side of the tire. The fact that these openings 9 are further remote from the tread 1 causes them to be compressed to a lesser degree, and in fact they might be so far from the tread that they would not be compressed at all. It is not essential that there be a great number of these openings throughout the length of a complete tire, but I would prefer that a cushion tire composed of a large percentage of rubber be rather honeycombed with the openings because the pumping or kneading of air throughout them will prolong the life of the rubber by ventilating it thoroughly and permitting the escape of heat generated by the action of the tire as the wheel revolves under the weight of its load. Yet I would make all the openings of such size and of such proximity to each other that their presence will lend a considerable resiliency to the tire, further than that inherent to it by reason of its material. Attention is directed to the fact that mud and sand will hardly remain in the outer ends of any of the openings, because as they are rapidly and constantly opened and closed to a greater or lesser extent, the foreign materials will be automatically dislodged. It is well known that cushion tires of this character when employed on trucks or electric vehicles have not so much resiliency as a rule as pneumatic tires, and therefore the vehicles are provided with springs of special resiliency, and perhaps with shock absorbers. As a result, the driver who is not looking for resiliency in the tire will use the latter until it is worn down to a considerable extent—much more than is possible with pneumatic tires—and of course the wear occurs on the tread side. An advantage arising from the specific construction of the ventilating openings above described therefore lies in the fact that, even when the tire is worn to an extent that the openings 7 are exposed at the tread side, the other openings or passages 9 and 6 remain and the ventilation of the tire continues. A further advantage resulting from the location of the openings 7 and 9 out of register with each other is that when this tire is applied to a driving wheel which is under considerable strain, it is not so likely to be torn across in passing over a sharp stone or other obstruction as it would be if the openings 7 and 9 stood in one plane or at equal distances from the hub. Finally, the disposition of these openings out of register with each other effects a certain pumping action, as it were, because when the tread side of the wheel contacts with the road or street under the load, it is obvious that the openings 7 will be compressed to a greater degree than the openings 9 which are nearer to the rim, with the result that to an extent the air standing within said openings 7 will be pumped both inward and outward by their reduction in size and some of it will be directed through the points 8 and 10 and along the openings 9.

For stiffening the base portion of my ventilated cushion tire composed wholly or in part of rubber I preferably form herein, as the tire is made, a series of metallic staples 15 with their heads lying along one of the ribs 4 and preferably protruding slightly therefrom and their legs 16 extending obliquely across the base 2 so that the tips 17 of said legs stand within the other or opposite rib 4 as seen. These staples may be of any desired size and material, preferably metal, but I would prefer to dispose them rather close together around the tire with their legs 16 equi-distant from each other and from the legs of the staples on either side, and all should stand at about an angle of forty-five degrees to a longitudinal line through the tire. A cushion tire equipped with stiffening means of this character within its base can be applied to an ordinary wheel having fixed flanges, or to the rim of an automobile wheel having any type of tire fastener wherein one flange is fixed and the other movable. If applied to such a wheel, when the movable flange is drawn into place, if it should so happen that the width of the base is considerable, setting up the movable flange will compress the staples 15 and deflect their legs to a more oblique position than that shown in Fig. 2 of the drawings. It is obvious that if the legs 16 of the staple 15 extended straight across the base, this deflection could not occur and the base of the tire would be secured upon the flanged rim only to the extent that the staples were clamped between its flanges. Attention is directed to the fact that when the tips 17 of the staples are thus brought into close contact with the inner face of one of the flanges, creeping of the tire in one direction at least is almost entirely prevented because said tips (especially if of well tempered metal) contact frictionally with and perhaps embed the inner face of the flange F to a slight degree. With this end in view the user of this improved tire will apply it to the wheel with the proper side outermost as will be understood.

What is claimed as new is:—

The herein described cushion tire formed with a series of ventilation openings extending from the inner face of its base in a substantially radial direction toward but not through its tread, a series of transverse openings connecting one side face of the tire at about the center of its width with said radial openings near their outer ends, and a second series of transverse openings connecting the other side face of the tire with said radial openings at points nearer said base than the first mentioned points of connection, all as and for the purpose set forth.

In testimony whereof I have hereunto set my hand in presence of two subscribing witnesses.

MICHEL J. SELZER.

Witnesses:
 WALTER R. TALBOT,
 WILLIAM F. FOUSE.